United States Patent [19]

Scully et al.

[11] Patent Number: 5,261,045
[45] Date of Patent: Nov. 9, 1993

[54] METHOD OF EXCHANGING ENTRIES FROM A PLURALITY OF DIFFERENT ELECTRONIC CALENDARS BASED ON INTERACTIVELY ENTERED CRITERIA

[75] Inventors: Keith J. Scully, Austin, Tex.; Harinder S. Singh, Chapel Hill, N.C.

[73] Assignee: International Business Machines Corporation, Armonk, N.Y.

[21] Appl. No.: 687,781

[22] Filed: Apr. 19, 1991

Related U.S. Application Data

[63] Continuation of Ser. No. 136,254, Dec. 18, 1987, abandoned.

[51] Int. Cl.⁵ .............................................. G06F 15/40
[52] U.S. Cl. ....................................... 395/161; 395/155; 368/29
[58] Field of Search ............... 364/518, 521, 705.01, 364/705.02, 705.02, 705.03, 705.04, 705.05, 705.07, 705.08, 300; 340/706, 717; 368/29, 10, 43, 251; 395/155, 161, 156, 157, 158, 159

[56] References Cited

U.S. PATENT DOCUMENTS

| | | | |
|---|---|---|---|
| Re. 32,655 | 4/1988 | Levine | 368/29 |
| 4,193,255 | 3/1980 | Ebihara et al. | 368/34 |
| 4,194,196 | 3/1980 | Mohiuddin | 340/711 |
| 4,319,337 | 3/1982 | Sander et al. | 364/900 |
| 4,362,392 | 12/1982 | Kumata | 368/82 |
| 4,415,271 | 11/1983 | Mori | 368/41 |
| 4,548,510 | 10/1985 | Levine | 368/10 |
| 4,591,840 | 5/1986 | Curtis et al. | 340/706 |
| 4,626,836 | 12/1986 | Curtis et al. | 340/706 |
| 4,645,238 | 2/1987 | Vincent et al. | 283/67 |
| 4,713,780 | 12/1987 | Schultz et al. | 364/514 |
| 4,769,796 | 9/1988 | Levine | 368/29 |
| 4,780,839 | 10/1988 | Hirayama | 364/710.01 |
| 4,807,154 | 2/1989 | Scully et al. | 364/518 |
| 4,809,201 | 2/1989 | Keklak | 364/518 |
| 4,896,306 | 1/1990 | Sanbongi et al. | 368/29 |

FOREIGN PATENT DOCUMENTS

0142067 5/1985 European Pat. Off. .

OTHER PUBLICATIONS

IBM TDB "Automated Meeting Data Structure for Information Interchange in an Office Network" vol. 29, No. 8, Jan. 1987, p. 3422.
Personal Computing, Jun. 1983, pp. 56-61, J. Rothfeder "Time Is Of The Essence".
"Time Management Business In Its Finest Hour" *Personal Computing*, Mar. 1982, pp. 34-40.

*Primary Examiner*—Phu K. Nguyen
*Attorney, Agent, or Firm*—Douglas H. Lefeve; Mark E. McBurney

[57] ABSTRACT

A method of exchanging date and time slot usage between calendar users. A date and time map structure is configured in a common way to allow the accessing of the map information using an algorithm and then responding to the provided information. The response would normally be to create a composite calendar for purposes of determining which time slots are not used for selected calendars to assist when establishing a group meeting. The structure supports specifying calendar categories, time span and granularity for the times represented by the used time slots in the map.

15 Claims, 6 Drawing Sheets

DATE AND TIME BIT MAP (DTB)

| BYTES | NAME | TYPE | MIN | MAX | LGTH | OPT |
|---|---|---|---|---|---|---|
| 0-1 | STRUCTURED FIELD LENGTH | NUM | 21 | 32767 | 2 | R |
| 2 | STRUCTURED FIELD TYPE1 | COD | X'D3' | X'D3' | 1 | R |
| 3 | STRUCTURED FIELD TYPE2 | COD | X'7A' | X'7A' | 1 | R |
| 4-32767 | DTB TRIPLETS | | | | | R |

FIG. 3

DATE AND TIME (DTM)

| BYTES | NAME | TYPE | MIN | MAX | LGTH | OPT |
|---|---|---|---|---|---|---|
| 0 | TRIPLET LENGTH | NUM | 6 | 255 | 1 | R |
| 1 | KEYWORD | COD | X'15' | X'15' | 1 | R |
| 2-3 | BEGIN DATE DAY | NUM | 1 | 366 | 2 | R |
| 4-5 | BEGIN DATE YEAR | NUM | -4095 | 4095 | 2 | R |
| 6-8 | BEGIN TIME | NUM | 0 | 86399 | 3 | O |
| 9-10 | END DATE DAY | NUM | 1 | 366 | 3 | O |
| 11-12 | END DATE YEAR | NUM | -4095 | 4095 | 2 | O |
| 13-15 | END TIME | NUM | 0 | 86399 | 3 | O |
| 12-255 | ADDITIONAL DATE TIME COMBINATIONS | | | | | |

FIG. 4A

ENTRY STATUS (EST)

| BYTES | NAME | TYPE | MIN | MAX | LGTH | OPT |
|---|---|---|---|---|---|---|
| 0 | TRIPLET LENGTH | NUM | 4 | 4 | 1 | R |
| 1 | KEYWORD | COD | X'1A' | X'1A' | 1 | R |
| 2-3 | STATUS | BST | | | 2 | R |

FIG. 4B

BIT MAP (BMP)

| BYTE | NAME | TYPE | MIN | MAX | LGTH | OPT |
|---|---|---|---|---|---|---|
| 0 | TRIPLET LENGTH | NUM | 7 | 255 | 1 | R |
| 1 | KEYWORD | COD | X'0A' | X'0A' | 1 | R |
| 2-4 | TIME SCALE | NUM | 1 | 86400 | 3 | R |
| 5 | TIME BYTE | NUM | 1 | 250 | 1 | R |
| 6-254 | TIME BYTE(S) | BST | | | 249 | R |

FIG. 4C

MAIN MENU SCREEN

SELECT THE ITEM NUMBER THEN HIT ENTER.

```
                                    AUGUST            1986
    1 CALENDAR ENTRY                                   1  2
      MEETING, APPOINTMENT,          3  4  5  6  7  8  9
      TRIGGER, NOTE, VACATION,      10 11 12 13 14 15 16
      HOLIDAY, OFFSITE,             17 18 19 20 21 22 23
      NOT NORMAL WORK HOURS         24 25 26 27 28 29 30
    2 VIEW SELECT                   31
    3 VIEW COMPOSITE CALENDAR
    4 CONFERENCE ROOM                SEPTEMBER        1986
    5 AUTOMATIC RESPONSE                1  2  3  4  5  6
    6 NAMES LIST SETUP                7  8  9 10 11 12 13
    7 RECONCILE CALENDARS           14 15 16 17 18 19 20
    8 AUTO INVOCATION               21 22 23 24 25 26 27
                                    28 29 30
COMMAND: _____

PF1=HELP   PF3=RETURN TO SYSTEM
```

FIG. 5A

VIEW SELECT SCREEN

VIEW SELECT (IF NO CLASSIFICATION, USER DEFINED FIELD OR PRIORITY IS SELECTED ALL CATEGORIES
           ARE RETURNED IN THE VIEW SELECT)
DISTRIBUTION LIST NAME: D35 NAMES A1 (OVERRIDES SPECIFIC INDIVIDUAL)
SPECIFIC INDIVIDUAL(S): SCULLY/AUSVM1 (ENTER THE VNET ADDRESS OR NICKNAME)
                        (PF11 ADDS LINES TO SELECT OTHER INDIVIDUALS)
SPECIFIC ENTRY: D35 MEETING A1 (SELECT A SPECIFIC ENTRY NAME)
VIEW SELECT FORMAT: _ (B=DATE AND TIME MAP VIEW, D=DETAILED VIEW)
MAP GRANULARITY: HOURS: _ (1-24) MINUTES: _ (1-60) SECONDS: _ (1-60)
                 (PICK ONE - HOURS, MINUTES OR SECONDS)
VIEW CRITERIA:  1+C+A  2+C+M  3  4  5  D+SEPTEMBE
(ENTER THE CRITERIA NUMBER SEPARATED BY A SPACE. SELECT FROM THE LISTS BELOW)
(SELECT CLASSIFICATIONS USING THE FOLLOWING FORMAT:
CLASSIFICATION+(C-CONFIRMED OR T-TENTATIVE)+(A-ATTENDING OR M-MAY ATTEND) )
   CLASSIFICATION LIST:  1 MEETING  2 APPOINTMENT  3 OFFSITE  4 VACATION  5 HOLIDAY  6 NOTE
                         7 NOT NORMAL WORK HOURS  8 DATE & TIME ONLY  9 TRIGGER
   ADDITIONAL VIEW CRITERIA: A PRIVATE ENTRIES  BX PRIORITY X (X=1 TO 10)
                             C OPEN TIME  D USER DEFINED FIELD (D+8 CHARS)
VIEW TIME SPAN (S): DATE: 10/07/86  START TIME: 8:00 AM
                    DATE: 10/09/86    END TIME: 5:00 PM
   THE WORK TIMES ON THE TARGET CALENDARS ARE PROFILE ITEMS ON THE INDIVIDUAL
   CALENDARS. THE VIEWS WILL ONLY RETURN TIMES IN THOSE TIME SLOTS.

PF1=HELP  PF3=CANCEL  PF4=NEXT COMMAND LINE  PF5=START VIEW SELECT
PF7=PREVIOUS SCREEN  PF8=NEXT SCREEN  PF9=FILE  PF11=ADD ONE LINE

FIG. 5B

VIEW COMPOSITE CALENDARS SCREEN

VIEW COMPOSITE CALENDARS (VIEW SELECT MUST BE USED BEFORE THIS FRAME).
DATE AND TIME MAP VIEW: __ (Y/N) (SELECTS A MAP COMPOSITE FOR THE INDIVIDUALS SELECT-
  ED OR THE COMPOSITE FOR THE ENTIRE NAMES LIST USED IN THE VIEW SELECT)
VIEW REQUEST DISTRIBUTION LIST NAME: D35 NAMES A1
SPECIFIC INDIVIDUAL(S): SCULLY/AUSVM1 (ENTER THE VNET ADDRESS OR NICKNAME)
  (PF11 ADDS LINES TO SELECT OTHER INDIVIDUALS)
SPECIFIC ENTRY: D35 MEETING A1 (SELECT A SPECIFIC ENTRY NAME)
VIEW TIME SPAN (S): DATE: 10/07/86    START TIME: 8:00 AM
                    DATE: 10/09/86    END TIME: 5:00 PM
VIEW FORMAT: D (HOUR/DAY/WEEK/MONTH/SIX MONTH)

MONTH AND SIX MONTH VIEWS ARE ALLOWED ONLY FOR COMPLETE VIEWS OF INDIVIDUAL
   CALENDARS AND FOR DATE AND TIME MAP VIEWS FOR ONE OR MORE INDIVIDUALS.
PF1=HELP   PF3=CANCEL   PF4=NEXT COMMAND LINE   PF5=SELECT VIEW SELECT
PF7=PREVIOUS SCREEN   PF8=NEXT SCREEN   PF9=FILE   PF11=ADD ONE LINE

DATE AND TIME MAP VIEW CALENDARS SCREEN

DATE AND TIME MAP VIEW (0=OPEN TIME, 1=USED TIME):
START TIME (10/07/87 - 8:00 AM)   END TIME (10/09/87 - 5:00 PM)
MAP GRANULARITY: HOURS: __ (1-24), MINUTES: 15 (1-60), SECONDS: __ (1-60)
DATE: 10/07/87
ADDRESS            8:00 AM                               1:00 PM                              5:00 PM
MAP COMPOSITE    (1111)  (1110)  (0111)  (1101)  (1011)  (1111)  (0000)  (0101)

SCULLY/VNET1     (1000)  (0100)  (0010)  (0000)  (0010)  (0101)  (0000)  (0001)
STARK/VNET2      (0100)  (1100)  (0000)  (1001)  (0000)  (1011)  (0000)  (0100)
TELFORD/VNET3    (0001)  (1010)  (0001)  (0001)  (1000)  (0000)  (0000)  (0100)
KOHAGEN/VNET2    (0010)  (0000)  (0100)  (0100)  (0001)  (0000)  (0000)  (0000)
RANDAL/VNET5     (1000)  (0100)  (0010)  (0000)  (0010)  (0101)  (0000)  (0001)
JDS/VNET6        (0100)  (1100)  (0000)  (1001)  (0000)  (1011)  (0000)  (0100)
WING2/VNET3      (0001)  (1010)  (0001)  (0001)  (1000)  (0000)  (0000)  (0100)
GOODRICH/VNET2   (0010)  (0000)  (0100)  (0100)  (0001)  (0000)  (0000)  (0000)

VIEW REQUEST DISTRIBUTION LIST NAME: D35 NAMES A1
VIEW CRITERIA: 1+C+A  2+C+M  3  4  5  D+SEPTEMBE
VIEW TIME SPAN (S): DATE: 10/07/86    START TIME: 8:00 AM
                    DATE: 10/09/86    END TIME: 5:00 PM
VIEW FORMAT: D (HOUR/DAY/WEEK/MONTH/SIX MONTH)

PF1=HELP   PF3=CANCEL   PF7=PREVIOUS SCREEN   PF8=NEXT 8 SECTION TIME SEGMENT
PF9=NEXT EIGHT NAMES   PF10=PREVIOUS EIGHT NAMES

FIG. 5D

METHOD OF EXCHANGING ENTRIES FROM A PLURALITY OF DIFFERENT ELECTRONIC CALENDARS BASED ON INTERACTIVELY ENTERED CRITERIA

This is a continuation of application Ser. No. 07/136,254 filed Dec. 18, 1987, now abandoned.

CROSS REFERENCE TO RELATED APPLICATIONS

This application is related in subject matter to the following application filed concurrently herewith and assigned to a common assignee:

Application Ser. No. 07/136,168 filed Dec. 18, 1987 now U.S. Pat. No. 5,070,470. This was filed by K. J. Scully et al. and is entitled "Methods for Handling Calendar Information In A Data Processing System".

1. Field of Invention

This invention relates in general to electronic calendaring methods, and in particular, to a methods of exchanging calendar entries from different calendars based on criteria that is entered interactively by a calendar owner.

2. Background Art

The prior art has disclosed a number and variety of interactive electronic calendaring systems and methods. The objective of all of these systems is primarily to assist the person who, for a number of different reasons, maintains a calendar of future events containing various information about the event at entry points on the calendar which relate to the time of the event.

The increase of personal computers and intelligent workstations in recent years has made it possible for calendar owners to establish and maintain their calendars on these interactive type data processing systems. Hence, the term "electronic calendaring."

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring methods generally do not limit the type of event that is calendared nor the terminology employed at any of the entry points and, to that extent, function in the same manner as conventional manual calendars or appointment books. The electronic calendaring method and systems do have an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network. Usually these networks have been established to permit the users to interact with each other and with data maintained on the system. In this environment, a user at a terminal or workstation can send a message to one or more of the other users on the network concurrently, and is notified when the addressees have received and read the message. In most of these environments, each user generally maintains a calendar, and in many of these environments the reason for having a network in which users interact, quite often involves user interaction that requires reference to the respective electronic calendars of the users. A considerable amount of time is therefore spent by calendar users in many organizations, with people checking and rearranging their calendars to accommodate various events such as meetings and presentations. Calendar systems have progressed to the point where a person who is calling a meeting can at least view the calendars of a number of users that he intends to invite to a meeting, in order to determine a common available time for the meeting.

In this prior art system, a screen is presented to the meeting originator which requests the data necessary for the system to determine times that all potential attendees would be available. The data requested includes, for example, the length of the meeting, a time period during which the meeting should be conducted, the place of the meeting and the names of the attendees. Based on this data, the method returns a screen of available times after inspecting each attendee's day calendar during the time period for free time slots or periods.

The originator then selects the beginning time and end time of the meeting, including the time and date, and invitations are automatically sent to all the attendees, requesting their attendance at the scheduled meeting.

While such an automatic system saves time in finding a convenient meeting time, relative to the manual process, the process is limited to the scheduling of meetings based on "free time" as represented by the absence of a calendar entry on each of the inspected calendars. This approach does not recognize that some calendar entries are less important than others and, in practice, it is often impossible to find a common period of "free time" for a meeting that involves a large group of people or a meeting involving a number of people whose work requires a large number of meetings.

The prior art systems are limited to examining calendars of others in connection with setting up a meeting. It was soon recognized that there were other situations besides calling a meeting where it would be beneficial to be able to create a "selected view" of a number of individual calendars.

A department manager, for example, may have an assignment that can be given to a number of different people in his department. If the calendaring system could display to the manager the calendared events of each of these people which meet a set of search criteria entered into this system interactively by the manager, considerable time and effort could be saved by everyone involved. While time available or free time may be one of the search criteria entered, other criteria such as the relative importance of the events that are calendared to the new assignment, might also provide the manager with more relevant data than just free time. Also, identifying the person who handled the same or similar assignment in the past, similar assignments scheduled in the future or other assignments scheduled at the same geographic location or customer could be important criteria for the manager to employ. These deficiencies of the prior art electronic calendaring methods, namely using only free time to find relevant calendar entries, are overcome by the present invention.

SUMMARY OF THE INVENTION

In accordance with the present invention, an method of generating a composite calendar in which a calendar owner can request the system to display or print out a selected subset of calendar entries from a plurality of calendars maintained by the electronic calendaring system. The method assists the calendar owner in defining the selected subset by presenting to him a "view select" screen containing various prompts to which he responds by keying in the search criteria that he wishes to employ, to determine if a calendar entry belongs to the subset. The subset is then displayed in one or more composite screens using a time granularity specified by the owner.

DESCRIPTION OF THE DRAWINGS

FIG. 3 illustrates the structure of a calendar object which is employed by the present invention.

FIGS. 4a through 4c illustrate structures of calendar triplets which are employed by the calendar object of FIG. 3.

FIGS. 5a through 5d are screens presented to a calendar owner to assist in defining criteria to be used by the system in selecting calendar entries during a view select function.

DESCRIPTION OF THE PREFERRED EMBODIMENT

Figure 1:
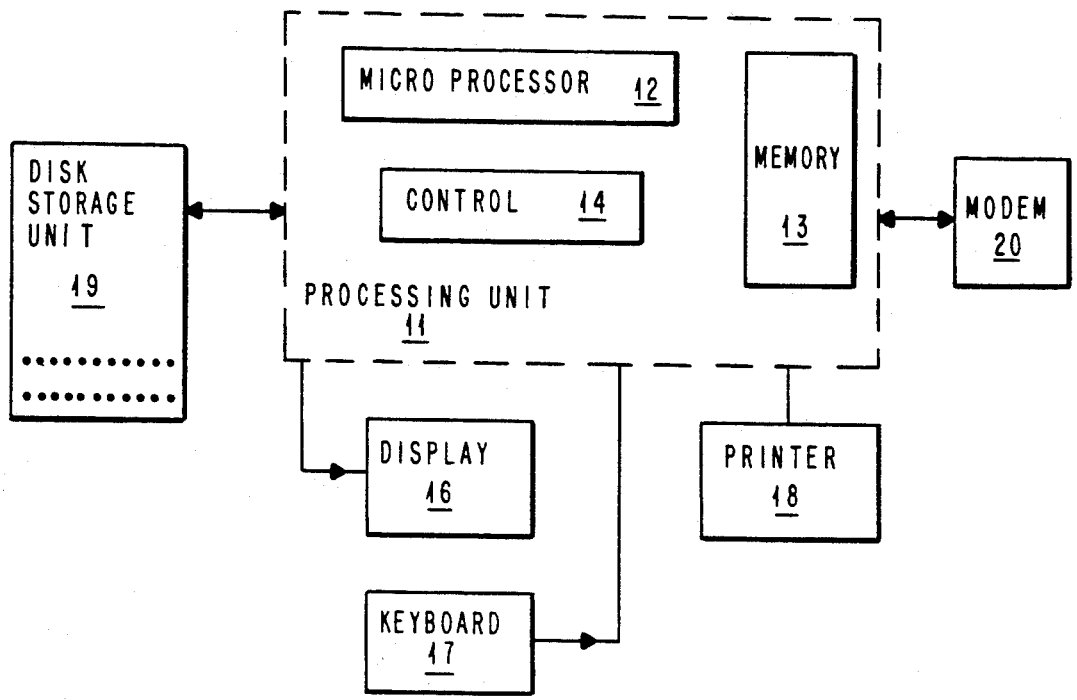
FIG. 1 illustrates an interactive workstation in which the method of the present invention may be advantageously employed.

FIG. 1 illustrates the functional components of an interactive type data processing terminal on which the electronic calendaring method of the present invention may be advantageously employed. The terminal comprises a processing unit 11 which includes a micro-processor block 12, a semiconductor memory 13, and a control block 14 which functions to control input/output operations in addition to the interaction between the micro-processor block 12 and the memory unit 13.

The terminal further includes a group of conventional peripheral units including a display device 16, a keyboard 17, a printer 18, a disk storage unit 19, and a modem 20. Since the details of the above-described functional blocks form no part of the present invention and can be found in the prior art, only a brief functional description of each block is set forth, along with a description of their interactions, sufficient to provide a person of ordinary skill in the art with a basis of understanding applicants' improved electronic calendaring method.

Processing unit 11 corresponds to the "system unit" of a personal computer system such as the IBM XT or IBM AT type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantially all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. Lastly, the modem 20 functions to transfer data from the terminal of FIG. 1 to a host system through one or more communication links which may be a commercial type link or a dedicated communication link.

Figure 2:
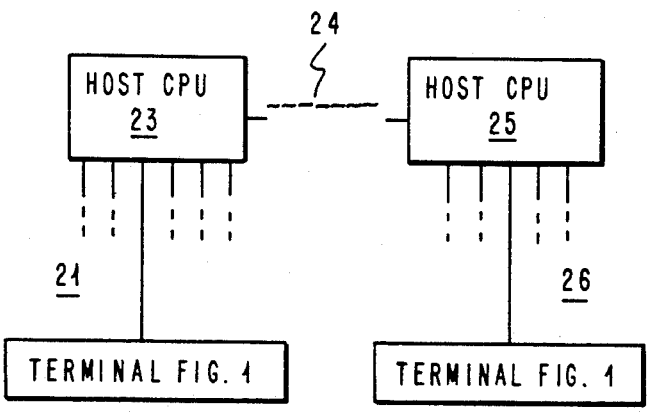
FIG. 2 illustrates a network of interactive workstations of the type shown in FIG. 1.

FIG. 2 illustrates a first information processing system which includes a network 21 of interactive type workstations of the type shown in FIG. 1. As illustrated, the network 21 includes a plurality of terminals which are interconnected with each other and to a host central processing unit 23. The information processing system is connected via communication link 24 to a second information processing system which includes a host processing unit 25 and a network 26 of interactive workstations. Functionally, the each of the systems operates to allow one terminal to communicate to one or more other terminals using established communication protocols, so that the various serially connected communication links are transparent to the operator. Such systems are well known in the art, and are currently in extensive commercial use. Since these communication links per se are not part of the present invention, only those details that are necessary for an understanding of the calendaring method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listings of individual calendar owners and shareable resources such as meeting rooms, etc., which require scheduling.

The system shown in FIG. 2 processes information as various types of data objects such as text data objects, graphic data objects, and calendar data objects. Each of these data objects are represented by a datastream which comprises a series of structured fields.

FIG. 3 shows a Date and Time Bit Map (DTB) which is a calendar structure which is required by the present invention to generate a composite calendar. The DTB structure provides an efficient way to pass date and time slot usage between calendar users for use in building the composite calendar. The DTB includes the following calendar triplets: a Date and Time (DTM) triplet, a Entry Status (EST) triplet and a Bit Map (BMP) triplet.

FIG. 4a shows the structure of the DTM triplet. The DTM triplet specifies the dates and times for the associated triplets in the calendar structured field. Date is specified as a combination of two two-byte parameters (day of the year and year). Time is in seconds beginning at midnight. Each DTM triplet requires one begin time and one begin date. The begin and end, date and time sequence may be repeated if additional begin and end date and begin end times are needed. If the number of dates and times exceed the number which can be transmitted in one DTM triplet, additional DTM triplets may be included the Calendar Structured Field. The only restriction is byte structure length.

DTM Parameters

BEGIN DATE DAY: The day of the year when the even begins.
BEGIN DATE YEAR: The year the event begins.
BEGIN TIME: The event start time in seconds.
END DATE DAY: The day of the year when the event ends.
END DATE YEAR: The year the event ends.
END TIME: The event stop time in seconds.

FIG. 4b shows the structure of the EST triplet. The EST triplet provides a specific status code for unavailable time and for open time on a calendar. A STATUS parameter in the EST triplet is a two-byte bit encoded value.

BIT

0 = Holiday—Non-work day
1 = Vacation—The calendar owner is on vacation.
2 = Offsite—The calendar owner is not at the normal work location and is unavailable.
3 = Onsite—The calendar owner is not at the normal work location, but is onsite.
4 = Non-Scheduled Time—Provides the means to transmit open time on a calendar.
5 = Date and Time Only—The entry is private and only date and time are provided.
6 = A confirmed meeting (attending) is scheduled for this time.
7 = A confirmed meeting (may attend) is scheduled for this time.
8 = A tentative meeting is scheduled for this time.
9 = A confirmed appointment (attending) is scheduled for this time.
10 = A confirmed appointment (may attend) is scheduled for this time.
11 = Calendar Note—The calendar entry contains character data.
12 = Trigger—The calendar entry is a trigger.

FIG. 4c shows the structure of the BMP triplet. The BMP triplet provides a manner to summarize calendar data for use in the Date and Time Bit Map.

BMP Parameters

TIME SCALE: The time increment carried in the bit map.

TIME BYTE LENGTH: The number of time bytes required to define the time span.

TIME BYTE: Each bit location in the Time Byte represents a time span equal to the Time Scale.

Bit zero represents the time span immediately after the Begin Time. A new Time Scale, Time Byte Length and Time Byte are required each time the Entry Status changes. This requires the use of a new BMP triplet in response to a status change in the Date and Time Bit Map structured field.

Other calendar structures and calendar triplets which are relevant to the present invention are disclosed in a copending application, Ser. No. 008,034, filed Jan. 29, 1987 in the name of K. J. Scully et al and assigned to the assignee of this application and which is incorporated herein by reference thereto.

THE PROCESS OF GENERATING A COMPOSITE CALENDAR

FIG. 5a shows a main menu screen which is displayed to an operator/calendar owner in response to the owner indicating to the system that a calendar function is to be performed. Upon the display of the main menu screen, the operator selects one of a plurality of functions displayed on the screen. In accordance with the present invention, the operator selects the function which pertains to the generation of a composite calendar. Therefore, the operator first selects a View Select function either by entering the numeral associated with the function View Select and pressing an enter key (not shown) on the keyboard 17 or by positioning a cursor adjacent to the function View Select on the display 16 and pressing the enter key.

In response to the selection of the View Select function, the system to which the operator is assigned, displays a view select screen shown in FIG. 5b. The operator then enters a name of a distribution list, one or more names of specific individuals or a specific event or entry upon which are to be utilized in the generation of the composite calendar. The operator subsequently selects a view select format in which the composite calendar is to be displayed. There are two view select formats from which the operator may select. A date and time map view format facilitates the display of the composite calendar using a plurality of bits which indicates whether a selected one of a plurality of events or a logical combination thereof is scheduled for a given time slot. A detailed view format facilitates the display of the composite calendar using the exact events scheduled for the given time slot. The operator must then enter an indication of granularity of the time which the composite calendar is to be displayed such as hours, minutes or seconds. A view criteria is then selected which facilitates the displaying of an indication of the scheduling or non-scheduling of the plurality events or the logical combination thereof. The operator also enters a view time span for the composite calendar to be generated. After the operator has entered all of the above-identified information, the operator initiates the execution of the view select process by pressing an appropriate function key indicated at the bottom of the view select screen. The system then re-displays the main menu screen shown in FIG. 5a while it executes the view select process in the generation of the composite calendar.

The information processing system connected to the operator's terminal then executes the view select process if all of the parameters are stored thereon and generates a time and bit map. The time and bit map facilitates the generation of the composite calendar by the system. If some or all of the parameters are stored on a remote system, a calendar object structure is transmitted to the remote system for processing. The calendar object structure includes the parameters, the view select format, the time granularity, the view criteria and the time span. After the remote system has processed the calendar object, a time and bit map is generated and transmitted by the remote system to system which generated the calendar object. Thereafter, the system combines the information generated thereby and the information generated by the remote system in generating the composite calendar.

In order to view the composite calendar, the operator must select a View Composite Calendar function displayed on the main menu screen. The system responds to the selection of the View Composite Calendar function with a view composite calendar screen shown in FIG. 5c. The operator then indicates whether a date and time map is to be selected, the name of the distribution list or name or names of the specific individuals or the specific event or entry entered on the view select screen, the time span and a view format on the view composite calendar screen. The operator then selects an appropriate function key, such as PF5, displayed on the screen to facilitate the display of the date and time map screen shown in FIG. 5d.

Shown in FIG. 5d is the date and time map view calendar screen which sets forth the composite calendar. The date and time map view calendar screen utilizes the binary digits or bits 1 and 0 to show the open times and the used times, respectively, in the composite calendar. The date and time map view calendar screen also displays the granularity of the time slots in the time span. For purposes of illustration, the time slots in FIG. 5d is shown in fifteen-minute increments. As noted above, the granularity was entered on the view select screen shown in FIG. 5b. The date and time map view calendar screen displays the first day of the time span. If the operator wants to view the date and time span for subsequent days in the time span, the operator presses an appropriate one of the function keys displayed on the date and time map view calendar screen. Moreover, if there are additional names included the composite calendar which are not displayed, the operator presses an appropriate one of the function keys to facilitate the display of the additional names.

Set out below is an illustration of a program for generating the composite calendar. The program is in program design language from which source code and machine code are derivable.

```
COMPOSITE CALENDAR PROC
    DO SELECT THE MAIN MENU ITEM 2
    DO SELECT EITHER DISTRIBUTION LIST
    NAME OR
        INDIVIDUAL NAMES FOR THE CALENDARS
        TO BE ACCESSED
    DO SELECT A SPECIFIC ENTRY OR EVENT
    DO SELECT VIEW FORMAT
    DO SELECT THE DATE AND TIME MAP
    GRANULARITY
    DO SELECT THE VIEW CRITERIA FOR THE
    INFORMATION
        TO BE REPRESENTED IN THE VIEW
    DO SELECT THE VIEW TIME SPAN(S)
    IF ALL REQUIRED ITEMS ARE SELECTED
        THEN BEGIN VIEW SELECT PROCESS
    ENDIF
```

-continued
```
    IF THE INDIVIDUAL IS LOCAL
        THEN INITIATE A LOCAL VIEW REQUEST
        ELSE INITIATE A REMOTE VIEW
        REQUEST
        IF THE REQUEST IS A DATE AND TIME MAP
        REQUEST
            THEN STORE ALL LOCAL ADDRESSES,
            SEARCH
                EACH ADDRESSED CALENDAR FOR
                THE REQUESTED INFORMATION,
                BUILD ALL DATE AND TIME MAP
                CALENDAR STRUCTURE FOR EACH
                ADDRESSED INDIVIDUAL AND
                GENERATE TIME AND
                BIT MAP FOR EACH INDIVIDUAL
                AND RETURN TO REQUESTING
                SYSTEM
        ENDIF
    ENDIF
    IF ONE OR MORE DATE AND TIME MAPS HAVE
    BEEN RETURNED
        THEN SELECT MAIN MENU ITEM 3
        DO SELECT EITHER INDIVIDUAL NAMES OR A
            DISTRIBUTION LIST NAME FOR THE
            CALENDAR ACCESSED
        DO SELECT A SPECIFIC ENTRY NAME OR EVENT
        DO SELECT THE VIEW TIME SPAN(S)
        DO SELECT THE VIEW FORMAT
        IF ALL REQUIRED ITEMS ARE SELECTED,
            THEN SELECT DATE AND TIME MAP VIEW
            SCREEN
        ENDIF
ENDIF
```

Figure 6:
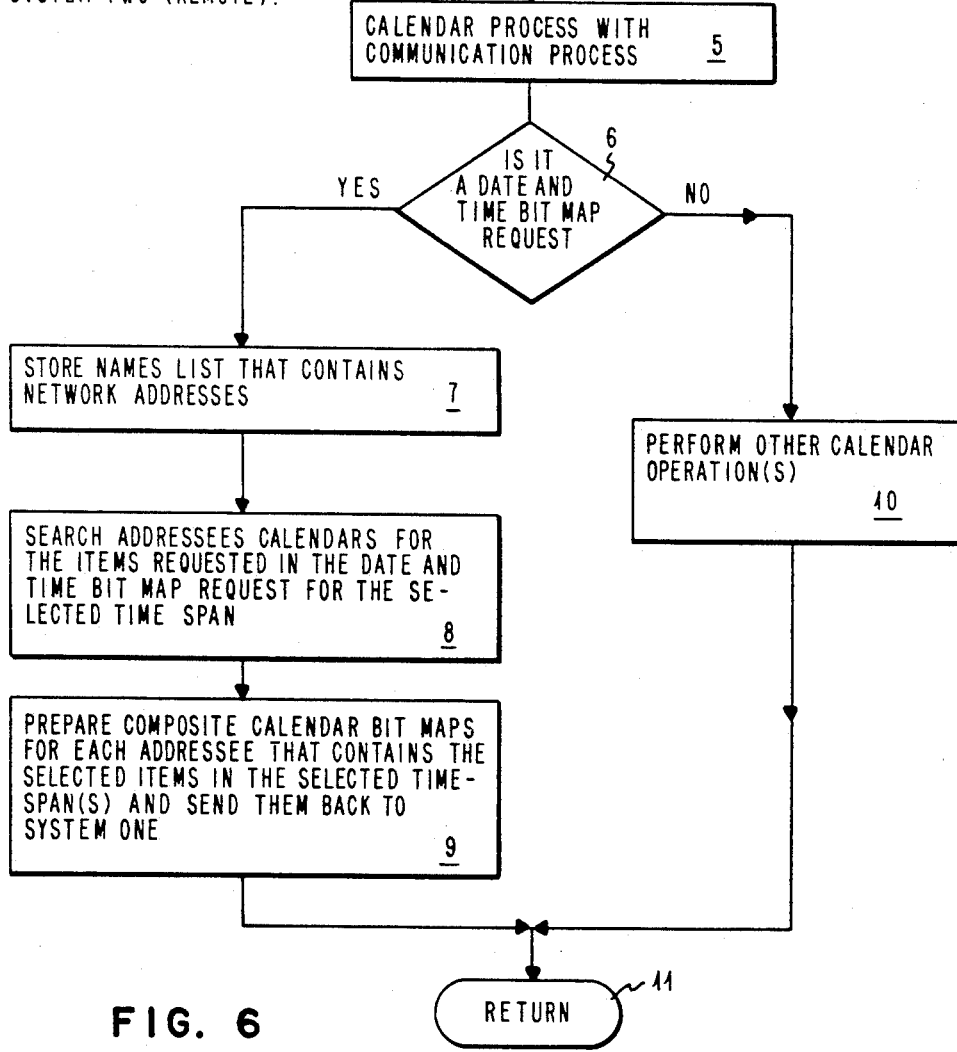
FIG. 6 a flow chart, illustrating the detailed steps of the method of the present invention.

FIG. 6 sets forth the steps flow diagram of a composite generation process. This chart assumes that at least one calendar to be included in the composite calendar to be generated is remotely connected to the host system which processes the calendar of the operator initiating the composite generating process. In the case of a calendar being resident on a remote system, it will be assumed that the remote system employs the same calendar architecture that is employed by the operator's system or that a suitable data interchange arrangement exists between the two systems to permit processing calendar objects.

It is assumed in FIG. 6 that the composite calendar generation process is for specified scheduled events between 10/07 and 10/09 within the time span of 8:00 a.m. on the 7th and 5:00 p.m. on the 9th. The calendar process represented by block 1 interacts with the view criteria in block 3 in order to determine how to select the composite view from the calendars of the individuals whose names and address appear on the Name List represented by block 2. Additionally, the calendar process determines from the items listed as the view criteria what to request and then builds a date and time bit map structure with the selected view criteria. For purposes of illustration, the view criteria as set forth on the view select screen shown in FIG. 5b is (1) confirmed meeting attending, (2) confirmed appointments may attend, (3) offsite, (4) vacation, (5) holidays, and (6) a user defined field "Septembe" during the time span indicated on the view select screen. The calendar process on System 1 then determines the address of the individual calendars to be search by reference to block 2, the process is started for the local system by reference to block 4 and then transmits a calendar object containing the date and time map structure along with a names list structure which contains individual network addresses to the remote system, e.g. System 2.

System 2 receives the calendar object in block 5 and acknowledges the receipt to System 1 and then initiates the processing of the calendar object. System 2 in processing the calendar object performs a search of the selected calendar according to the view criteria selected. The calendar process on System 2 is substantially the same as the process on System 1 except that a different set of calendars are searched during the process.

If the calendar object transmitted by System 1 to System 2 was not a date and time bit map request, control is transferred from block 6 to block 10 so that System 2 can perform the requested calendar function. Thereafter, control is returned through block 5 to block 1.

If the calendar object transmitted by System 1 to System 2 was a date and time bit map request, control is transferred from block 6 to block 7. Addresses which are associated with the names list transmitted from System 1 are then generated. These addresses tells System 2 where the associated calendars are located. The associated calendars are then searched in block 8 for the specified scheduled appointments, meetings, vacation, holidays and offsite. As each of the associated calendars are searched, a composite calendar which includes only the bit representation of the calendar data is built in block 9. As noted above, the bit representation set forth the classifications selected on the view select screen for the time span indicted thereon. System 2 then transmits the date and time bit map calendar data for each of the calendars searched to System 1 through block 5.

System 1 then invokes block 11 to facilitate the display of the generated composite calendar. The operator then selects the view select function from the view composite calendar screen shown in FIG. 5c. As shown in FIG. 5d, the first day of the generated composite calendar is displayed. The operator can display the additional days in the time span or additional names in the composite calendar by selecting the appropriate function displayed on the screen.

While the invention has been shown and illustrated with reference to a preferred embodiment, it will be understood by those skilled in the art that various modifications may be made without departing from the spirit of the invention and scope of the appended claims.

We claim:

1. A method of generating a composite calendar for display on an information processing system using logically combinable calendar information relating to a plurality of calendars stored in said information processing system, said method comprises steps of:
   selecting one of a plurality of formats for said composite calendar;
   specifying one or more names of specific individuals associated with at least one of said plurality of calendars;
   specifying an increment of time within a time span for displaying said composite calendar;
   specifying a status subset of said calendar information for the composite calendar;
   searching said stored calendar information for at least one of the plurality of calendars associated with said names of specific one or more individuals according to said increment of time, said status subset of said calendar information and the names of said specific individuals;
   generating said composite calendar by combining the stored calendar information found as a result of said search of said at least one of the plurality of calendars; and
   simultaneously displaying the result of said search in said composite calendar, on said information processing system, in said selected one of said plurality of formats, said composite calendar including said specified increment of time within said time span, said specified one or more names of individuals, and said specified status subset of information.

2. The method as recited in claim 1 wherein the generating step includes the step of:
   building a composite calendar structure which includes entries from each of said plurality of calendars and a logical combination of the respective entries of said plurality of calendars according to said specified increment of time.

3. The method as recited in claim 2 wherein the building step includes the step of displaying each of said entries utilizing single digit characters for each specified increment of time within said time span.

4. The method as recited in claim 3 wherein said status subset of said information includes at least one item of the group of comprising holiday, vacation, offsite, onsite, non-scheduled time, confirmed meeting, confirmed meeting, tentative meeting, confirmed appointment, or confirmed appointment.

5. A method of exchanging calendar information between data processing systems having logically combinable information relating to a plurality of calendars stored therein, said method comprises the steps of:
   selecting one of a plurality of formats for said calendar information;
   specifying one or more names of specific individuals associated with at least one of said plurality of calendars;
   specifying an increment of time within a time span for said calendar information;
   specifying a status subset of said information for the composite calendar;
   transmitting said calendar information stored in a first data processing system to a second data processing system in said selected one of said plurality of formats according to said specified one or more names of individuals, said increment of time within a time span, and said specified status subset of information; and
   combining said transmitted calendar information stored in the first system with calendar information from the second system.

6. The method as recited in claim 5 further comprises the step of generating a composite calendar in response to the requesting and combining steps.

7. The method as recited in claim 6 further includes the step of specifying said time span wherein said calendar parameters are effective.

8. The method as recited in claim 7 further includes the step of specifying criteria for selecting said calendar information to be viewed in said composite calendar.

9. The method as recited in claim 8 further includes the step of combining various logical combinations of said criteria for said selecting calendar information.

10. The method as recited in claim 7 wherein said status subset of said information includes at least one item of the group of comprising holiday, vacation, offsite, onsite, non-scheduled time, confirmed meeting, confirmed meeting, tentative meeting, confirmed appointment, or confirmed appointment.

11. The method as recited in claim 8 further includes the step of processing a calendar object on said second system whereby said calendar object includes said selected one of said plurality of formats, said specified criteria, said increment of time and said time span.

12. The method as recited in claim 11 wherein the step of requesting includes the steps of:
   transmitting said calendar object from said second system to said first system; and
   processing said calendar object on said first system.

13. The method as recited in claim 11 wherein the step of processing said calendar object on said first system and second system includes the step of searching at least one calendar stored on said first system and second system, respectively.

14. The method as recited in claim 11 wherein the steps of processing said calendar object on said first system and said second system includes the steps of:
   generating a date and time map for each calendar searched on said first system; and
   transmitting said date and time map for each calendar searched on said first system to said second system.

15. The method as recited in claim 6 wherein the generating step includes the step of displaying said composite calendar having a plurality of bits, each of which represents a time frame within said time span according to said specified increment of time.

* * * * *